United States Patent [19]

Völker et al.

[11] 4,353,208

[45] Oct. 12, 1982

[54] EXHAUST GAS PURIFICATION APPARATUS FOR AN INTERNAL COMBUSTION ENGINE OF MOTOR VEHICLES

[75] Inventors: Herbert Völker, Hanau; Polat Öser, Wolfsburg, both of Fed. Rep. of Germany

[73] Assignee: Deutsche Gold- und Silber-Scheideanstalt Vormals Roessler, Frankfurt, Fed. Rep. of Germany

[21] Appl. No.: 179,393

[22] Filed: Aug. 19, 1980

Related U.S. Application Data

[63] Continuation of Ser. No. 925,896, Jul. 19, 1978, abandoned.

[30] Foreign Application Priority Data

Jul. 28, 1977 [DE] Fed. Rep. of Germany ....... 2734010

[51] Int. Cl.³ .............................................. F01N 3/28
[52] U.S. Cl. ..................................... 60/299; 60/302; 422/171; 422/180
[58] Field of Search .................. 60/299, 302; 123/670, 123/668; 422/180, 171

[56] References Cited

U.S. PATENT DOCUMENTS

| 2,075,388 | 3/1937 | De Cloud | 123/669 |
| 3,166,895 | 1/1965 | Slayter | 60/304 |
| 3,807,173 | 4/1974 | Zmuda | 60/302 |
| 3,855,986 | 12/1974 | Wiss | 123/668 |
| 3,908,365 | 9/1975 | Schweibold | 60/274 |
| 3,947,545 | 3/1976 | Ishida | 60/302 |
| 4,276,331 | 6/1981 | Bothwell | 422/180 |

FOREIGN PATENT DOCUMENTS

| 968970 | 6/1975 | Canada | 60/299 |
| 2436559 | 2/1976 | Fed. Rep. of Germany . | |
| 2540882 | 3/1977 | Fed. Rep. of Germany . | |
| 2557725 | 6/1977 | Fed. Rep. of Germany | 60/299 |
| 2330858 | 6/1977 | France | 60/299 |

*Primary Examiner*—Douglas Hart
*Attorney, Agent, or Firm*—Beveridge, DeGrandi & Kline

[57] ABSTRACT

An exhaust gas purification apparatus for an internal combustion engine including a catalyst chamber containing a catalyst composition for the catalytic conversion of harmful substances contained in the exhaust gases wherein the interior wall of the exhaust pipe connecting the engine with the catalyst chamber is provided with a catalytically active coating for at least a portion of its length.

1 Claim, 1 Drawing Figure

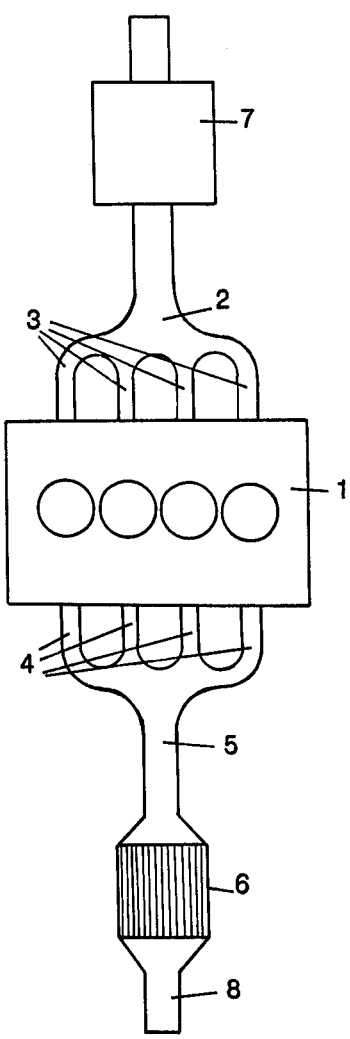

EXHAUST GAS PURIFICATION APPARATUS FOR AN INTERNAL COMBUSTION ENGINE OF MOTOR VEHICLES

This is a continuation of application Ser. No. 925,896 filed July 19, 1978, now abandoned.

The present invention relates to an exhaust gas purification apparatus for an internal combustion engine of vehicles, especially of motor vehicles, provided with a catalyst for the catalytic conversion of harmful substances contained in the exhaust gases of the internal combustion engine, which catalyst is inserted in an exhaust gas pipe attached to the internal combustion engine.

In motor vehicles equipped with a catalytic exhaust gas purification apparatus, it repeatedly happens that catalysts are damaged by melting processes. Such damage is reproduceable only with the breakdown of individual or all ignition mechanisms of the internal combustion engine during operation of the motor vehicle, so that the fuel-air-mixture produced in the carburetor is not fired in the combustion chambers of the internal combustion engine but instead is ignited in the afterconnected catalytic gas purification chamber apparatus by catalytic means, and is there burnt while producing incompatibly high temperatures. Since the heat developed by this type of combustion is not conducted away or at least not conducted away fast enough by the relatively poor heat conducting catalyst carrier to the outside wall of the exhaust pipe surrounding the catalyst and there to be irradiated into the atmosphere, fusions will occur above all in the axis area of such catalysts, which may lead quickly to a destruction and failure of the entire exhaust gas purification apparatus.

At the same time, ignition breakdowns do not only occur in case of a defective ignition installation, but even whenever the driver turns off the ignition by operation of the ignition switch, while the engine is still turning, and simultaneously operates the gas pedal. In this situation, an under-pressure is produced in the induction system by the revolving engine, which despite the no load valve in the carburetor being turned off by the ignition switch, still aspirates fuel. This fuel, however, can no longer be ignited in the combustion chamber because of the turned off ignition switch and then burns out in the catalytic chamber for exhaust gas purification operating at high temperatures.

Now, the task on which the invention is based consists in avoiding as much as possible, damage to the catalytic exhaust gas purification arrangement in the event of ignition failure. In particular, it is intended to avoid having larger quantities of a not-ignited fuel-airmixture reach the catalyst chamber which contains the catalytic pellets, beads or monolith, and to be there ignited and burnt.

The solution of this task is accomplished according to the invention, by at least a part of the exhaust tail pipe, connecting the internal combustion engine with the catalyst chamber, being provided at its inside wall with a catalytically active coating. Effectively in this case at least a front part of the interior of the exhaust tail pipe in the direction of flow of the exhaust gas, is to be provided with the catalytically active coating. At the same time, the invention takes into consideration the realization, proven by experiments, that any overheating and damage of the catalyst may be avoided in case of ignition failure, whenever the combustion of the quantities of the mixture not ignited in the combustion chambers of the internal combustion engine, can take place first in the exhaust tail pipe and not first in the catalyst chamber by catalytic reaction. In the exhaust tail pipe there is indeed the possibility, in contrast to the catalyst chamber, to deliver the heat released during combustion to the atmosphere through the relatively thin metallic walls of the exhaust pipe. For the introduction of the combustion it is sufficient at the same time, to provide the inside wall of the exhaust tail pipe, at least one part of its length and preferably in the forward area in the direction of flow of the exhaust gas, with a catalytically effective coating. It will be apparent from the foregoing that the exhaust gas will be contacted with the catalytically active coating within the exhaust pipe before the gas reaches the catalyst chamber containing the catalytic converter catalyst.

The invention is further illustrated by reference to the drawing which shows an exhaust system according to the invention.

The drawing shows, in schematic presentation, an illustrative embodiment of the invention which will be explained in more detail in the following paragraphs. In the drawing there is an internal combustion engine 1, such as for example, a four-cylinder gasoline engine (Otto carburetor engine) of a motor vehicle, to which a fuel-air-mixture, processed in a carburetor 7, is fed via an induction manifold 2, dividing into induction pipes 3, assigned in the individual cylinders. On the discharge side, the exhaust gas is collected into a common collective exhaust tail pipe 5, via exhaust pipes 4, assigned to the individual cylinders, in which pipe 5, a monolithic catalyst 6 in a chamber (the catalytic converter) is inserted for the catalytic conversion of the harmful substances contained in the exhaust gas. An exhaust pipe 8 leading into the atmosphere, possibly by way of a muffler arrangement, follows behind the catalyst 6.

According to the invention, provision is to be made that at least a part of the exhaust pipe system, connecting the internal combustion engine 1 with the catalyst 6, which in the illustrative embodiment shown in the drawing, includes the exhaust manifolds 4 and the exhaust pipe 5, is coated on its inside wall with a catalytically active coating. As the result of such a catalytic coating of the inside wall of the exhaust pipe according to the invention, in the event of an ignition failure in one or more cylinders, the unignited portion of the mixture carried along by the exhaust gas would be ignited and burnt promptly very early in the exhaust pipe. The heat developing thereby would then be conducted to a relatively large extent through the relatively thin walls of the exhaust pipe, to the atmosphere, so that the thermal load on the catalyst in such a case would remain limited. At the same time, it may be sufficient if not the entire exhaust pipe system between the catalyst 6 and the internal combustion engine 1 is provided with such a catalytic coating, but only a certain part of the entire length of the exhaust pipe, and preferably the front part, viewed in the direction of flow of the exhaust gas is so coated.

The coating of the inside wall of the exhaust pipe with catalytically active layers, wherein the catalytic compositions are known per se, preferably may be accomplished with noble metals of the platinum group. However, it is also quite possible to use other catalytically active substances for the coating of the inside wall of the exhaust pipe. The compositions and combinations of catalytically active materials are widely known in the art as will be apparent to those skilled in the art. The thickness of an effective catalytic coating is also a matter which is known in the art and accordingly does not form a part of the invention.

Customarily the catalytically active layers are applied to ceramic monolithic or bulk material carrier bodies. However, metallic carrier bodies may also be used. The measure of the coating of the inside wall of the exhaust pipe connecting the internal combustion engine with the catalyst, according to the invention, may be used advantageously in case of all these catalysts.

We claim:

1. In an exhaust gas purification apparatus for an internal combustion engine including
   a catalyst chamber containing a catalyst composition comprising noble metals of the platinum group for the catalytic conversion of harmful substances contained in the exhaust gases of the internal combustion engine deposited on a catalyst carrier therefor,
   which chamber is connected to one end of an exhaust pipe, the other end of said exhaust pipe being connected to the internal combustion engine, said exhaust pipe having relatively thin walls,
   wherein the catalyst carrier is susceptible to melting and damage at incompatibly high temperatures in said catalyst chamber caused by ignition and combustion of unburned hydrocarbon fuel resulting from improper or incomplete burning in the combustion engine of the fuel-air-mixture produced in the carburetor and the inability of said carrier to sufficiently rapidly conduct away the heat generated as a result of said ignition and combustion.
   the improvement which prevents large quantities of non-ignited fuel-air mixtures from reaching the catalyst chamber containing said carrier,
   and comprising at least a part of the inside wall of the exhaust pipe connecting the internal combustion engine with the catalyst chamber being coated with a noble metal of the platinum group containing layer
   wherein the exterior and interior surfaces of said exhaust pipe do not have any other coating applied thereto,
   whereby any fuel-air mixtures leaving the internal combustion engine in a non-ignited or unburned condition will be ignited and burned in said part of the exhaust pipe which is coated with said catalytically active coating,
   and the substantial quantities of heat released by the combustion in said exhaust pipe being radiated to a relatively large extent to the atmosphere through the relatively thin walls of the exhaust pipe,
   so that the temperature in the catalyst chamber is not raised sufficiently high to fuse or melt the catalyst carrier,
   and whereby the catalyst carrier containing the catalyst composition is protected against overheating due to unwanted ignition and burning.

* * * * *